United States Patent

[11] 3,559,703

| [72] | Inventors | Robert V. Maul<br>Tulsa;<br>Everett L. Swalley, Barsdall, Okla. |
|---|---|---|
| [21] | Appl. No. | 828,864 |
| [22] | Filed | May 29, 1969 |
| [45] | Patented | Feb. 2, 1971 |
| [73] | Assignee | Cities Service Oil Company<br>Tulsa, Okla.<br>a corporation of Delaware |

[54] FLUID SAMPLE INJECTOR FOR GAS CHROMATOGRAPH
10 Claims, 1 Drawing Fig.

[52] U.S. Cl. ........................................................ 141/329
[51] Int. Cl. ....................................................... B56b 1/04
[50] Field of Search ........................................... 73/23.1;-
222/(Inquired), 80, 309, 50; 141/(Inquired), 329;
55/197, 386

[56] References Cited
UNITED STATES PATENTS

| 3,203,455 | 8/1965 | Horabin | 141/329 |
|---|---|---|---|
| 3,374,660 | 3/1968 | McKinney | 73/23.1 |

*Primary Examiner*—Stanley H. Tollberg
*Attorney*—J. Richard Geaman

ABSTRACT: A fluid sample to be analyzed is delivered to a fluid analyzing instrument, e.g. a gas chromatography column, by delivery through conduit means to a passageway inside a housing removably secured to the fluid analyzing instrument. Interconnecting with this passageway is a second passageway extending from the outer end of the housing to the end thereof secured to the instrument. This second passageway is aligned with the point at which the fluid may be injected into the fluid analyzing instrument. A syringe-type device having a needle adapted to fit in this second passageway and having a sufficient length to extend therethrough into the fluid analyzing instrument is provided. In order to prevent the venting of the fluids delivered to the interconnecting passageways, thereby affecting the composition of the fluid to be analyzed, sealing means, such as a rubber pad, is provided and positioned across the second passageway extending to the outermost end thereof. The needle may be inserted into the passageway by penetrating the sealing means, which has a self-sealing character so as to form a tight seal about the needle passing therethrough. In order to prevent the uncontrolled flow of fluids to the gas analyzing instrument, sealing means are also provided between the housing and the instrument and are positioned across the passageway extending therebetween. The needle, containing the desired quantity of the fluid to be analyzed, may be passed through the sealing means into the gas injection point of the instrument. The housing is conveniently formed in three parts, an intermediate cell having the interconnecting passageways extending therethrough, an inner end cap removably secured to this cell and the instrument and having a passageway extending therethrough in alignment with the end to end passageway in the cell, and an outer end cap removably secured to said cell and also having a passageway extending therethrough in alignment with the end-to-end passageway extending through the cell. The sealing means across the passageway extending from end to end of this three-part housing are positioned between the outer end cap and the cell, between the cell and the inner end cap, and between the inner end cap and the fluid analyzing instrument. Thus, a fluid sample delivered to the passageways in this fluid injector device may be passed therefrom into the analyzing instrument by means of the needle portion of the syringe-type device without any change in composition, so that the results of the fluid analyzing operation will accurately reflect the composition of the gas being analyzed.

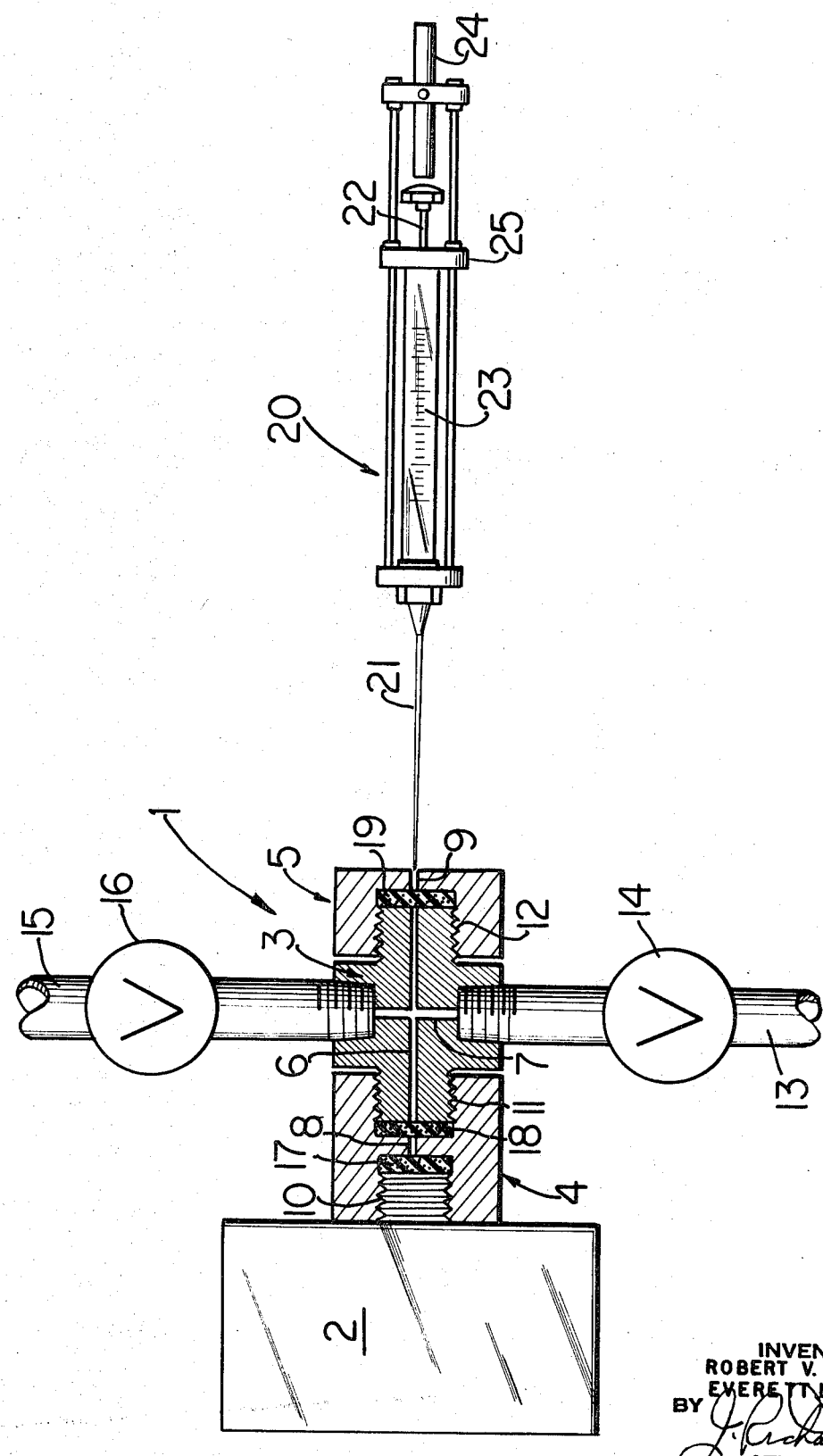
PATENTED FEB 2 1971
3,559,703
INVENTORS
ROBERT V. MAUL
EVERETT L. SWALLEY
BY
ATTORNEY

FLUID SAMPLE INJECTOR FOR GAS CHROMATOGRAPH

BACKGROUND OF THE INVENTION

1. Field of the Invention

This invention relates to a fluid sample injector for fluid analyzing instruments. More particularly, it relates to a device for assuring that the fluid analyzed constitutes a representative sample of the fluid whose analysis is desired.

2. Description of the Prior Art

In many commercial and laboratory operations, fluid samples are removed from a particular operation for analyses in fluid analyzing instruments, such as a gas chromatography column. When the fluid to be analyzed comprises a single component material, a sample thereof may readily be withdrawn into a syringe of known volume and thereafter injected into the column by plunging the needle portion thereof through a rubber septum into the interior of the column. Such columns are normally operated at maximum pressures of from about 50 to about 60 p.s.i.g. after the sample has been injected therein. A carrier gas is usually provided for sweeping the sample through the column for analysis at the column pressure.

When the fluid to be analyzed comprises a mixture of two or more components, particularly a mixture of gas and liquid, that exist as a single phase at relatively high pressure, e.g. 2500 p.s.i.g. or higher, this simple technique is not entirely satisfactory because of the difficulty in furnishing a representative sample of the fluid mixture to the analyzing instrument. This problem arises because of the exposure of the fluid in the needle of the syringe to the atmosphere for at least a limited period of time prior to the injection of the sample into the chromatographic column or other analyzing instrument. The sample thereby tends to convert from a single phase to a two-phase system in which a portion of the sample to be tested may pass off into the surrounding atmosphere. To the extent that the portion of the sample thus lost to the atmosphere differs in composition from the portion remaining in the syringe, the sample injected into the column will deviate from a precise representation of the composition of the fluid to be tested. This deviation will be of particular significance when the mixture to be analyzed comprises gaseous and liquid components that exist as a single phase at relatively high pressure in the fluid mixture to be analyzed. This departure from the representative character of the sample, of course, causes the results obtained by the analysis in the chromatographic column or other analyzing instrument to deviate from a precise analysis of the fluid mixture from which the sample had been drawn. For this reason the use of a standard hypodermic syringe to withdraw a sample of the fluid to be analyzed can only be successfully utilized when a precise analysis of the fluid is not required or when the fluid comprises a single component, low pressure material existing in the liquid phase.

An appreciation of the limitations inherent in the obtaining of a fluid sample by means of a syringe has led to the development of alternate means for obtaining a representative fluid sample for analysis. For example, a sampling valve has been developed that utilizes a cone-expanded Teflon insert in a stainless steel body to measure reproducible quantities of a sample in a pressurized sampling loop. A 45° turn of the shaft positioned in the body cuts the sample from the source, and a carrier gas then sweeps the sample from the loop into the column or other fluid analyzing instrument for analysis. The sampling valve is usually heated in order to maintain the fluid sample in a single phase. Because of design limitations, the operating pressure for such sampling valves is usually restricted to about 1000 p.s.i.g. or less. In addition, a device of simpler construction is also desired.

It is an object of the present invention, therefore, to provide a fluid sample injector for fluid analyzing instruments.

It is another object of this invention to provide an improved fluid sample injector suitable for use with respect to samples comprising a mixture of two or more components.

It is another object of this invention to provide a fluid sample injector capable of delivering a fluid mixture existing as a single phase at high pressure to a fluid analyzing instrument.

It is a further object of the present invention to provide a fluid sample injector capable of delivering a representative sample of the fluid to the measuring instrument.

It is a further object of this invention to provide a fluid sample injector for minimizes differences in composition between the fluid to be analyzed and the sample delivered to the analyzing instrument.

With these and other objects in mind, the present invention is hereinafter set forth in detail, the novel features thereof being pointed out in the appended claims.

SUMMARY OF THE INVENTION

The objects of the present invention are accomplished by means of a fluid sample injector removably attached to the gas chromatograph column or other fluid analyzing instrument employed. The sample to be analyzed is delivered to the interior of a housing removably secured to the instrument. The needle of a syringe is also injected into the interior of the housing and a measurable quantity of the fluid is drawn into the interior portion of the needle. The needle is then further injected through the housing into the fluid analyzing instrument itself. The sample in the needle is then expelled therefrom and may be drawn through the analyzing instrument by conventional means, as for example by a carrier gas in a gas chromatographic column.

Sealing means are provided so as to avoid the venting of the sample within the housing to the atmosphere. Sealing means are also provided to prevent the uncontrolled flow of fluids directly into the fluid measuring instrument. The sealing means employed comprise materials penetrable by the needle of the syringe and having a self-sealing character so as to form a tight seal about the needle inserted therethrough. The exposure of the sample drawn into the needle portion of the syringe to the atmosphere, and the consequent opportunities for a loss of a portion of the sample to the atmosphere, are thereby avoided by the device of the present invention. Since the device may readily be secured to the chromatographic column or other instrument itself, the present invention offers an ease of operation comparable with that of the ordinary syringe-sampling technique heretofore employed.

The housing portion of the apparatus of the present invention is conveniently provided in three separate portions removably secured to one another. The housing has two interconnecting passageways therein. Through one such passageway, the fluid sample is passed by means of conduit means in communication with the source of the fluid to be analyzed. The other passageway constitutes the channel through which the needle portion of the syringe is inserted. This passageway is in alignment with the fluid injection point of the instrument employed so that, upon receiving a measurable portion of the fluid injected into the housing, the needle may be further inserted through the appropriate sealing means into the instrument itself.

BRIEF DESCRIPTION OF THE DRAWING

The present invention is hereinafter further described with reference to the accompanying drawing illustrating a side elevational view, partly in cross section, of an embodiment of the present invention.

DETAILED DESCRIPTION OF THE INVENTION

In the drawing, the injector housing is generally represented by the numeral one. As shown, housing 1 is removably secured to the gas chromatographic column or other fluid analyzing instrument represented generally by the numeral two. In the illustrated embodiment, housing 1 comprises three separable sections, namely, a central cell 3, an inner end cap 4 and an outer cap 5. Interconnecting passageways are positioned within cell 3, the first passageway 6 extending from end-to-end therethrough. The second passageway 7, which is interconnecting with said first passageway 6, extends through cell 3 from side-to-side therein.

Housing 1 is attached to the analyzing instrument 2 by the removably securing of inner end cap 4 to instrument 2 by means of the threaded portion 10. Inner end cap 4, in turn, is removably secured to cell 3 by means of the threaded portion 11. In a like manner, cell 3 is removably secured to outer end cap 5 by means of threaded portion 12. The first passageway 6 extending through cell 3 is in alignment with passageway 8 extending from end-to-end in inner end cap 4 and passageway 9 extending from end-to-end in outer end cap 5.

Conduit inlet means 13 are removably secured to cell 3 and are in communication with second passageway 7 therein. Valve means 14 are provided in conduit means 13 in order to control the flow of fluid into the interior of housing 1. Conduit outlet means 15 are removably secured to the opposite side of cell 3 and are in communication with the opposite side of said second passageway 7 extending therethrough. Valve means 16 are provided to control the discharge of fluid from the interior housing 1.

In order to prevent the uncontrolled flow of fluids through first passageway 6 in cell 3 and passageway 8 in inner end cap 4 into instrument 2, sealing means 17 between instrument 2 and inner end cap 4 at threaded portion 10 are positioned around and across the end of passageway 8 in inner end cap 4 and the fluid injection point of instrument 2 that is in alignment therewith. Sealing means 17 also serve to prevent the flow of fluid between inner end cap 4 and instrument 2 to the atmosphere. In order to similarly prevent the flow of fluids between inner end cap 4 and cell 3 to the atmosphere, sealing means 18 are also provided between said inner end cap 4 and cell 3, said sealing means being positioned around and across the opposite end of passageway 8 in inner end cap 4 and said first passageway 6 in cell 3.

Since passageway 6 in cell 3 and passageway in outer end cap 5 are in alignment and extend to the atmosphere, sealing means 19 are provided in order to prevent fluid within housing 1 from venting to the atmosphere. Said sealing means 19 are placed in contact with cell 3 and outer end cap 5 at threaded portion 12 therebetween and are positioned around and across the joining ends of said passageway 6 in cell 3 and passageway 9 in outer end cap 5 so as to prevent the flow of fluids therebetween.

In order to pass a portion of the fluids from the interior of housing 1 into fluid analyzing instrument 2, syringe 20, having needle portion 21 thereof, is provided. Fluids may be drawn into or expelled from the interior portion of needle 21 by movement of plunger 22 out of or into said needle 21. For ease of convenience in measuring the amount of fluid drawn into the needle, scale 23 is provided for use in conjunction with a benchmark not shown, on or attached to plunger 22 so that its relative position may conveniently the amount of fluid in the needle at the given position of the plunger. As a further convenience, stop 24 may be provided in order to limit the movement of the plunger outwardly from the needle to a predetermined position at which a desired quantity of fluid will be drawn into the needle. Support means 25, a portion of which is shown, is provided in order to conveniently secure the syringe in proper position for operation. This support may conveniently be secured to housing 1.

In operation, fluid may be drawn from a source of supply to be analyzed through conduit means 13 to the interior of housing 1. The fluid passes into passageway 7 and the interconnecting passageway 6 in cell 3. In an initial flushing of the pressurized fluid through the cell in order to insure that a representative sample of the material contained within housing 1, valve 16 on fluid outlet conduit 15 may be left open.

After flushing, valve 16 is closed so as to retain the fluid within the interior of housing 1. The needle 21 of syringe 20 is then inserted through sealing means 19 into the end-to-end passageway 9 in outer end cap 5 and passageway 6 in cell 3. Plunger 22 is then pulled out from its innermost position in needle 21 so as to draw a measurable quantity of the fluid into said needle 21. The needle is then inserted through sealing means 18 and sealing means 17 into the injection point of instrument 2. Plunger 22 is thereafter moved to its innermost position within needle 21 so as to expel the fluid from the needle into the body of instrument 2 for analysis in accordance with the ordinary operation of the instrument employed. Syringe 20 may then be moved back so as to remove needle 21 from instrument 2 into position for the collection and delivery of subsequent samples to the instrument.

Any convenient syringe-type device having a needle portion capable of insertion in the end-to-end passageway extending through housing 1 may be employed in the practice of the present invention. A standard commercially available hypodermic syringe, such as those supplied by the Hamilton Co., Inc., of Whittier, California, may conveniently be employed.

Sealing means 17, 18 and 19 should, of course, be penetrable by needle 21 and, preferably, should be of a self-sealing character so as to form a tight seal about the needle inserted therethrough. For this purpose, rubber pads have been found convenient, although any other rubberlike, plastic or similar material capable of being penetrated by the needle and of a self-sealing character so as to form a pressure-tight seal about the needle inserted therethrough may readily be employed.

The present invention is particularly useful in sampling a fluid comprising a mixture comprising two or more components that exist as a single phase at relatively high pressure. For example, mixtures of gas and liquid that exist as a single phase at pressures of up to 2500 p.s.i., or higher, are difficult to analyze with precision in gas chromatography columns because of the difficulty of injecting the fluid sample as a single phase into the column. The sample may be readily delivered from the fluid source at high pressure, however, to the high pressure, low volume injector cell of the present invention as a single phase fluid. The sample is then delivered directly into the gas chromatography column or other fluid analyzing instrument without the loss of any portion thereof to the atmosphere. The sample delivered to the analyzing instrument by means of the present invention, therefore, constitutes a more truly representative sample of the fluid to be analyzed than has heretofore been possible using conventional means for delivering the sample to the column. Since the injector housing, comprising the cell and end caps referred to above, need only be adapted to receive a low-volume of fluid for purposes of analysis, the housing can readily be made to withstand the relatively high pressures under which the fluid may be delivered thereto. The housing may conveniently be made of such materials as stainless steel, aluminum or the like depending upon the particular pressure requirements and the nature of the fluids to be sampled. The conventional hypodermic syringe that may be employed in this invention has also been found to be capable of withstanding high fluid pressures in the relatively low-volume needle portion thereof into which the fluid may be drawn. The present invention, as a result, does not suffer the restrictive pressure limitations of some previous attempts to provide means for delivering a representative sample to the fluid analyzing instrument. The apparatus of the present invention has a relatively simple construction, relatively low cost of manufacture, and considerable advantages in ease in convenience of operation. For these reasons, the present invention provides a highly significant means for assuring the delivery of a representative sample of fluid to an analyzing instrument so that the fluid analysis obtained is truly representative of the composition of the fluid to be tested.

While the invention has been described herein with reference to particular embodiments thereof, it will be appreciated by those skilled in the art that various changes and modifications can be made therein without departing from the scope of the invention as hereinafter set forth in the appended claims.

We claim:

1. An apparatus for the injection of a fluid sample into a fluid analyzing instrument comprising:

a. a housing removably secured to said fluid analyzing instrument, said housing having passageways therein, the first passageway extending from end-to-end and being in alignment with the fluid injection point of the instrument at the end of the housing secured to said instrument, the second passageway interconnecting with said first passageway within the housing and being adapted to receive a sample of the fluid to be analyzed;

b. first conduit means for delivering a supply of the fluid to be analyzed to the second passageway of said housing;

c. a syringe-type device having a needle portion thereof capable of insertion in said first passageway, said needle being of sufficient length to permit insertion therethrough into the gas analyzing instrument at the fluid injection point thereof, said device also having a plunger means capable of movement between a fluid collecting position in which fluid is drawn into said needle and a fluid expelling position in which fluid is forced from said needle;

d. first sealing means contacting said housing and positioned across said first passageway so as to prevent the fluid that enters said housing through said second passageway from venting to the atmosphere through said first passageway, said sealing means being penetrable by said needle and of a self-sealing character so as to form a tight seal about the needle inserted therethrough; and e. second sealing means contacting said housing and positioned across said first passageway so as to prevent the uncontrolled movement of fluid therefrom into said fluid analyzing instrument, said second sealing means being penetrable by said needle and of a self-sealing character so as to form a tight seal about the needle inserted therethrough into said instrument whereby, a representative sample of the fluid to be analyzed may be delivered to the interior of said housing and passed, by means of said needle, into the fluid analyzing instrument without change in composition due to a loss of a portion thereof to the atmosphere, thereby assuring that the analysis of the sample in said instrument accurately reflects the composition of the fluid to be analyzed.

2. The apparatus of claim 1 in which said housing comprises:

a. a cell having said interconnecting passageway therein, the first passageway extending from end to end thereof and the second passageway being adapted to receive a sample of the fluid to be analyzed;

b. an inner end cap removably secured to said cell and to said instrument, said inner cap having a passageway therethrough in alignment with said first passageway of the cell and also in with the fluid injection point of said instrument; and c. an outer end cap removably secured to said cell, said outer end cap having a passageway therethrough in alignment with said first passageway through said cell, said first sealing means being placed between said cell and said outer end cap and positioned across the passageway extending therebetween so as to prevent the venting of fluids to the atmosphere, and said second sealing means being placed between said cell and inner end cap and positioned across said passageway extending therebetween so as to prevent the uncontrolled flow of fluid into said analyzing instrument.

3. The apparatus of claim 2 in which said second passageway in said cell extends from side to side therein and including second conduit means for discharging fluids from said passageway and including valve means for controlling the flow of fluids through said second conduit means, whereby the passageways in said housing may be purged so as to assure that a representative sample of the fluids being analyzed is contained within said housing.

4. The apparatus of claim 3 and including third sealing means placed between said cell and said inner end cap and positioned across said first passageway extending therebetween, said third sealing means being penetrable by said needle and of a self-sealing character so as to form a tight seal about the needle inserted therethrough.

5. The apparatus of claim 2 and including valve means positioned in said first conduit means for controlling the delivery of fluids to said second passageway in said cell.

6. The apparatus of claim 4 and including mechanical means for securing said syringe-type device to said housing.

7. The apparatus of claim 1 in which said syringe-type device has a calibration scale associated therewith so that the amount of fluid drawn into said needle by movement of said plunger means into a fluid collecting position may readily be observed, facilitating the injection of a desired volume of the sample to be analyzed into said instrument.

8. The apparatus of claim 7 and including stop means attached to the mechanical means for securing said syringe-type device to said housing, said stop means being positioned so as to limit the movement of said plunger means to a predetermined point so as to facilitate the collecting of a predetermined quantity of fluid in said needle and subsequently expelling said predetermined quantity of fluid from said needle into said fluid analyzing instrument.

9. The apparatus of claim 1 in which said first and second sealing means comprise rubber pads capable of maintaining pressure-tight seals around said needle inserted therethrough.

10. The apparatus of claim 4 in which said first, second and third sealing means comprise rubber pads capable of forming a pressure-tight seal around said needle inserted therethrough.